United States Patent
Bennett et al.

(10) Patent No.: US 7,800,856 B1
(45) Date of Patent: Sep. 21, 2010

(54) DISK DRIVE FLUSHING WRITE CACHE TO A NEAREST SET OF RESERVED TRACKS DURING A POWER FAILURE

(75) Inventors: George J. Bennett, Murrieta, CA (US); Dean M. Jenkins, La Canada-Flintridge, CA (US); Robert D. Catiller, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 23 days.

(21) Appl. No.: 12/410,338

(22) Filed: Mar. 24, 2009

(51) Int. Cl.
G11B 21/02 (2006.01)
G11B 5/596 (2006.01)

(52) U.S. Cl. .................. 360/75; 360/78.04; 714/24; 711/113

(58) Field of Classification Search .................. None
See application file for complete search history.

(56) References Cited

U.S. PATENT DOCUMENTS

| | | | |
|---|---|---|---|
| 4,375,663 A | 3/1983 | Arcara et al. | |
| 4,516,214 A | 5/1985 | Ray | |
| 5,198,942 A | 3/1993 | Iizuka et al. | |
| 5,414,861 A | 5/1995 | Horning | |
| 5,471,353 A | 11/1995 | Codilian et al. | |
| 5,768,045 A | 6/1998 | Patton, III et al. | |
| 5,872,670 A | 2/1999 | Ataee | |
| 5,889,629 A | 3/1999 | Patton, III | |
| 5,969,899 A | 10/1999 | Utenick et al. | |
| 6,188,192 B1 | 2/2001 | Chen | |
| 6,295,577 B1 | 9/2001 | Anderson et al. | |
| 6,316,898 B1 | 11/2001 | Albrecht et al. | |
| 6,396,652 B1 | 5/2002 | Kawachi et al. | |
| 6,476,996 B1 | 11/2002 | Ryan | |
| 6,516,426 B1 * | 2/2003 | Forehand et al. | 714/24 |
| 6,549,359 B1 | 4/2003 | Bennett et al. | |
| 6,549,361 B1 | 4/2003 | Bennett et al. | |
| 6,566,832 B2 | 5/2003 | Ataee | |
| 6,567,232 B1 | 5/2003 | Klaassen | |
| 6,574,062 B1 | 6/2003 | Bennett et al. | |
| 6,577,465 B1 | 6/2003 | Bennett et al. | |
| 6,594,102 B1 | 7/2003 | Kanda et al. | |
| 6,725,397 B1 | 4/2004 | Emberty et al. | |
| 6,795,894 B1 | 9/2004 | Neufeld et al. | |
| 6,798,599 B2 | 9/2004 | Dykes et al. | |
| 6,876,508 B1 | 4/2005 | Patton, III et al. | |
| 6,924,956 B2 | 8/2005 | Kurihara | |
| 6,937,429 B2 | 8/2005 | Yoshida et al. | |
| 6,970,319 B1 | 11/2005 | Bennett et al. | |
| 6,972,921 B1 | 12/2005 | Rana et al. | |

(Continued)

Primary Examiner—Andrew L Sniezek

(57) ABSTRACT

A disk drive is disclosed comprising a head actuated over a disk having a plurality of data tracks and a first and second set of reserved tracks, wherein the first set of reserved tracks are located at a first radial location, and the second set of reserved tracks are located at a second radial location different than the first radial location. A write command is received from a host, wherein the write command comprises user data which is stored in a cache memory. When a power failure is detected, whether the head is nearer to the first or second set of reserved tracks is determined, and then the head is positioned to the nearest of the first and second set of reserved tracks. The user data stored in the cache memory is written to the reserved tracks, and the head is unloaded onto a ramp.

20 Claims, 7 Drawing Sheets

U.S. PATENT DOCUMENTS

| | | |
|---|---|---|
| 7,006,320 B1 | 2/2006 | Bennett et al. |
| 7,068,460 B2 | 6/2006 | Brenden et al. |
| 7,075,745 B2 | 7/2006 | Kaneko et al. |
| 7,095,579 B1 * | 8/2006 | Ryan et al. .................... 360/75 |
| 7,116,512 B1 | 10/2006 | Rana et al. |
| 7,126,857 B2 | 10/2006 | Hajeck |
| 7,161,757 B1 | 1/2007 | Krishnamoorthy et al. |
| 7,310,196 B1 | 12/2007 | Schreck et al. |
| 2001/0050823 A1 * | 12/2001 | Watanabe et al. ............. 360/31 |
| 2002/0167750 A1 | 11/2002 | Kurihara |
| 2005/0264914 A1 | 12/2005 | Kusumoto |

* cited by examiner

DISK DRIVE FLUSHING WRITE CACHE TO A NEAREST SET OF RESERVED TRACKS DURING A POWER FAILURE

BACKGROUND

Description of The Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Disk drives may comprise a volatile semiconductor memory for caching user data before it is written to the disk. This improves performance of the disk drive as seen by the host since the disk drive can immediately return a "ready" status in response to a write command rather than require the host to wait until the user data has been written to the disk. However, due to the risk of losing the cached user data in the event of a power failure, the host may disable the write cache and forego the better performance. The prior art has suggested various techniques for implementing an auxiliary power supply (e.g., a battery) during a power failure to ensure that a write cache can be safely flushed to the disk. However, implementing an auxiliary power supply having sufficient energy to flush the write cache and unload the heads under all circumstances may be prohibitively expensive to implement in a mass production disk drive.

The prior art has suggested to lower the cost of the auxiliary power supply by converting the energy stored in the momentum of the disk pack into a supply voltage (i.e., the back electromotive force voltage generated by the spindle motor as it spins down). However, it is desirable to flush the write cache to the disk as soon as possible after detecting a power failure; otherwise, the velocity of the spindle motor may fall to a level where writing data to the disk is no longer possible (or significantly less reliable).

DETAILED DESCRIPTION OF EMBODIMENTS OF THE INVENTION

Figure 1A:
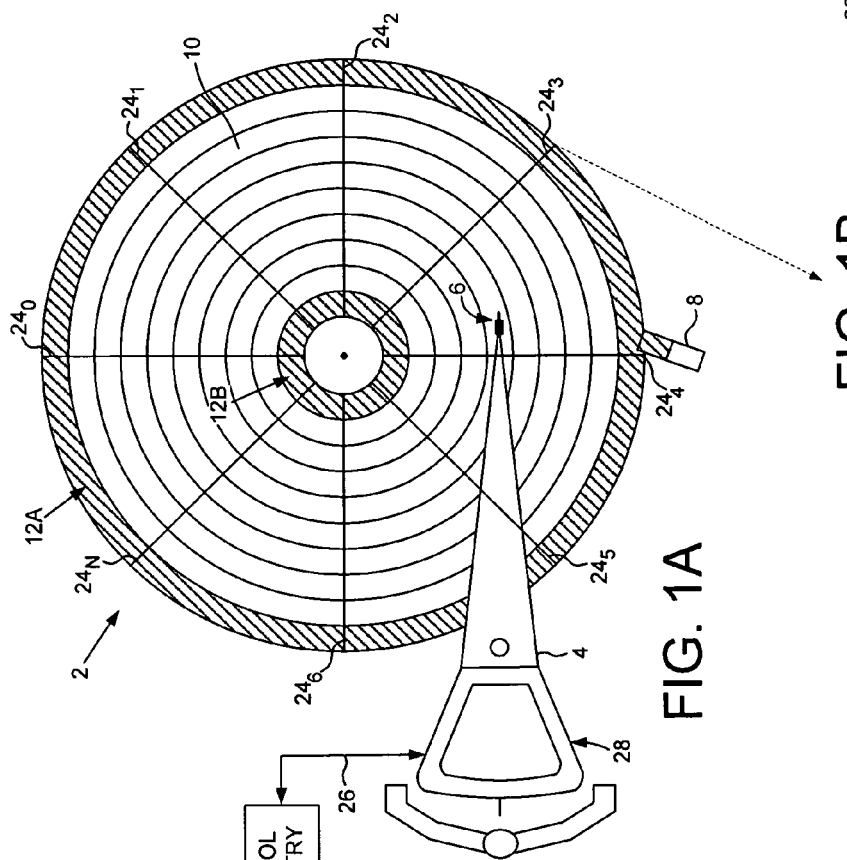
FIG. 1A shows a disk drive according to an embodiment of the present invention comprising a disk, a head connected to a distal end of an actuator arm, and a ramp near an outer periphery of the disk, wherein the disk comprises a first and second set of reserved tracks for flushing a write cache during a power failure.

FIG. 1A shows a disk drive according to an embodiment of the present invention comprising a disk 2, an actuator arm 4, a head 6 connected to a distal end of the actuator arm 4, and a ramp 8 near an outer periphery of the disk 2. The disk 2 comprises a plurality of data tracks 10 and a first and second set of reserved tracks 12A and 12B, wherein the first set of reserved tracks 12A are located at a first radial location, and the second set of reserved tracks 12B are located at a second radial location different than the first radial location. The disk drive further comprises control circuitry 14 operable to execute the flow diagram of FIG. 1C. A write command is received from a host (step 15), wherein the write command comprises user data which is stored in a cache memory (step 17). When a power failure is detected (step 16), whether the head is nearer to the first or second set of reserved tracks 12A and 12B is determined (step 17), and then the head is positioned to the nearest of the first and second set of reserved tracks (step 18). The user data stored in the cache memory is written to the reserved tracks (step 20), and the head is unloaded onto the ramp (step 22).

In the embodiment of FIG. 1A, the disk 2 comprises a plurality of servo sectors $24_0$-$24_N$ that define the plurality of data tracks 10 and the sets of reserved tracks 12A and 12B.

The control circuitry 14 processes the read signal to demodulate the servo sectors $24_0$-$24_N$ into a position error signal (PES). The PES is filtered with a suitable compensation filter to generate a control signal 26 applied to a voice coil motor (VCM) 28 which rotates the actuator arm 4 about a pivot in order to position the head 6 radially over the disk 2 in a direction that reduces the PES. The servo sectors $24_0$-$24_N$ may comprise any suitable position information, and in an embodiment shown in FIG. 1B, each servo sector comprises a preamble 30 for synchronizing gain control and timing recovery, a sync mark 32 for synchronizing to a data field 34 comprising coarse head positioning information such as a track number, and servo bursts 36 which provide fine head positioning information. The coarse head position information is processed to position a head over a target track during a seek operation, and the servo bursts 36 are processed to maintain the head over a centerline of the target track while writing or reading data during a tracking operation.

In one embodiment, the control circuitry 14 implements a suitable auxiliary power supply for powering the disk drive during a power failure. Any suitable auxiliary power supply may be employed, such as a button cell battery or a capacitor. In another embodiment, in order to reduce the cost of the disk drive, the kinetic energy stored in the rotating spindle motor and disk pack is converted into an auxiliary power supply, examples of which are disclosed in U.S. Pat. No. 6,574,062; U.S. Pat. No. 6,970,319; and U.S. Pat. No. 6,549,361; the disclosures of which are incorporated herein by reference.

It is desirable to maximize the size of the write cache in order to maximize the performance derived from employing a write cache. However, to avoid losing write data during a power failure the auxiliary power supply must provide sufficient energy to flush the write cache to the disk and then unload the actuator arm. Ultimately this means it is desirable to minimize the cost of the auxiliary power supply while maximizing the size of the write cache. Described herein are several embodiments which help reduce the amount of energy required to flush the write cache to the disk during a power failure, thereby decreasing the cost of the auxiliary power supply and/or increasing the size of the write cache.

Figure 2:
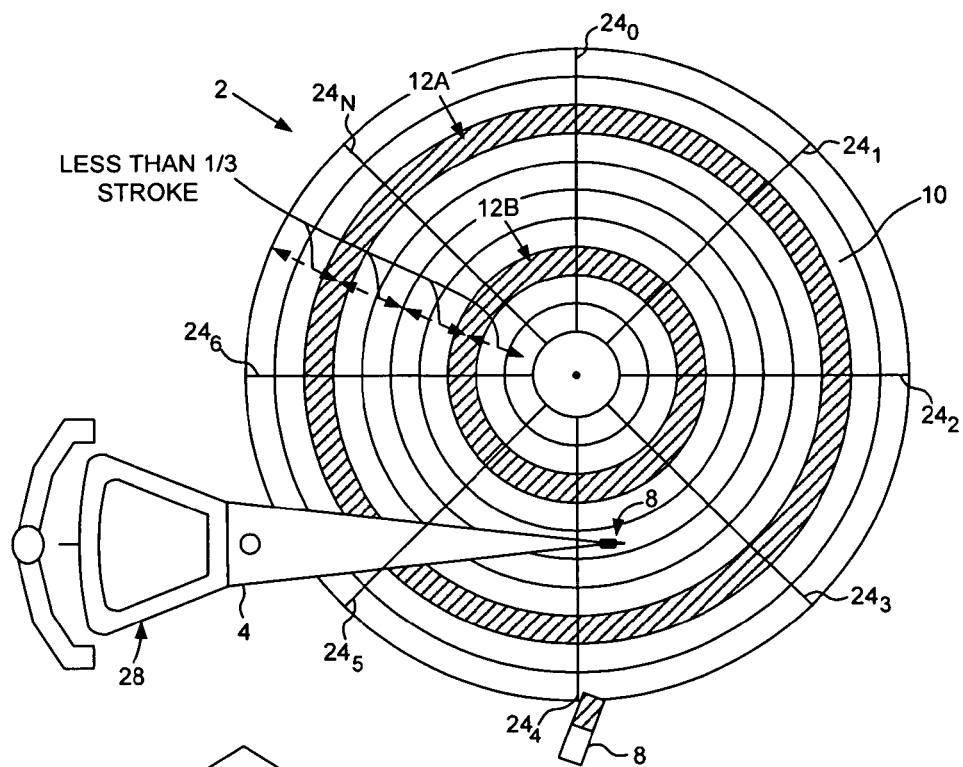
FIG. 2 shows an embodiment of the present invention wherein the disk comprises at least two sets of reserved tracks which are spaced so that the maximum seek distance is less than one-third of the stroke of the actuator arm.

Employing at least two sets of reserved tracks helps reduce the requisite energy during a power failure by reducing the seek distance for the head. Referring to the embodiment of FIG. 1A, a first set of reserved tracks 12A are located near an outer diameter of the disk 2, and a second set of reserved tracks 12B are located near an inner diameter of the disk 2. When a power failure occurs, the control circuitry 14 determines which set of reserved tracks the head 6 is nearest, and then seeks the head 6 to the selected set of reserved tracks. In this embodiment, the maximum seek distance is one-half the stroke of the actuator arm 4. In an embodiment shown in FIG. 2, the multiple sets of reserved tracks may be spaced radially across the disk surface so that the maximum seek distance is less than one-third the stroke of the actuator arm 4. Although the embodiments of FIGS. 1A and 2 show two sets of reserved tracks, other embodiments may employ more than two sets of reserved tracks spaced radially over the disk surface.

Figure 1B:
FIG. 1B shows the format of a servo sector according to an embodiment of the present invention.
Figure 1C:
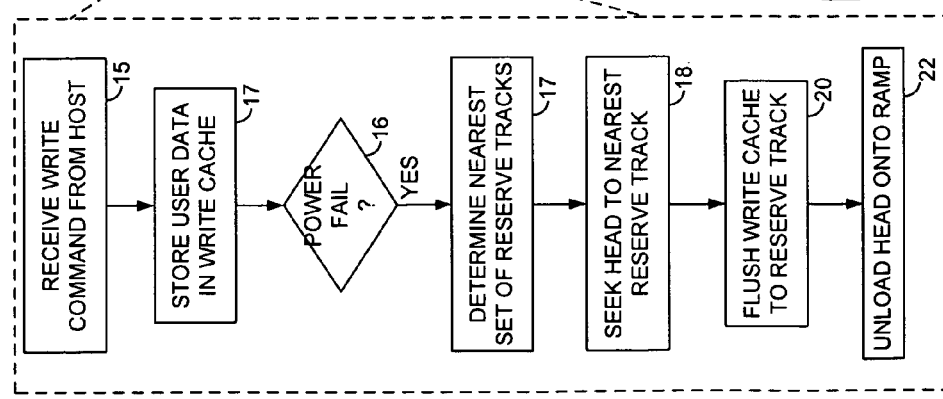
FIG. 1C is a flow diagram according to an embodiment of the present invention wherein during a power failure the head is positioned over the nearest set of reserved tracks in order to flush the write cache prior to unloading the head onto the ramp.
Figure 3A:
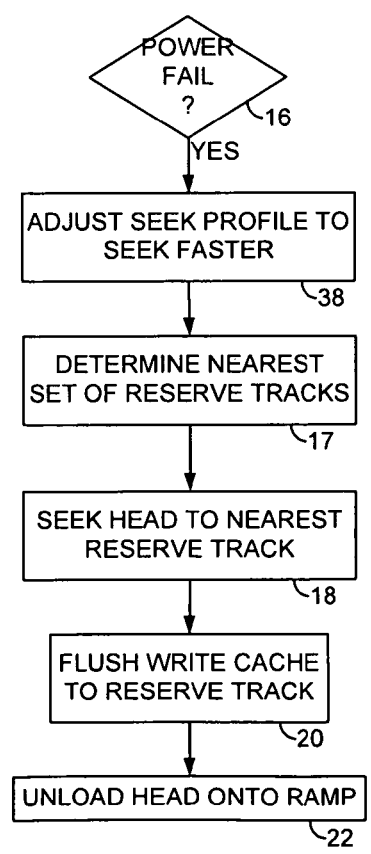
FIG. 3A is a flow diagram according to an embodiment of the present invention wherein the seek profile is adjusted during the power failure so as to seek the head to the reserved tracks using less power.
Figure 3B:
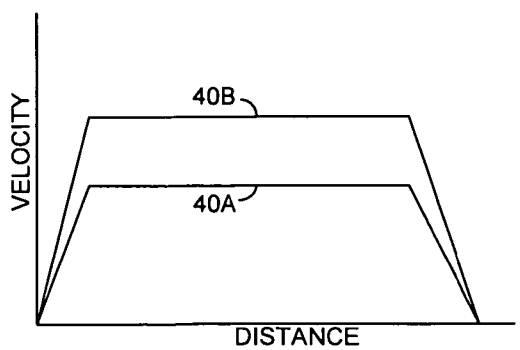
FIG. 3B shows a first seek profile employed during normal operation, and a second seek profile employed during a power failure.

FIG. 3A is a flow diagram according to an embodiment of the present invention which extends on the flow diagram of FIG. 1B, wherein when a power failure is detected (step 16) a seek profile for seeking the actuator arm is adjusted (step 38) prior to seeking the head to the nearest reserved track. For example, in an embodiment shown in FIG. 3B, the maximum velocity of a first seek profile 40A used during normal operation may be increased during a power failure to generate a second seek profile 40B which may require less power. Alternatively, the maximum velocity of the first seek profile may be decreased to seek the head with less power, or other aspects of the seek profile may be adjusted, such as adjusting the acceleration and/or deceleration segments of the seek profile in order to seek the head using less power during the power failure.

Figure 4A:
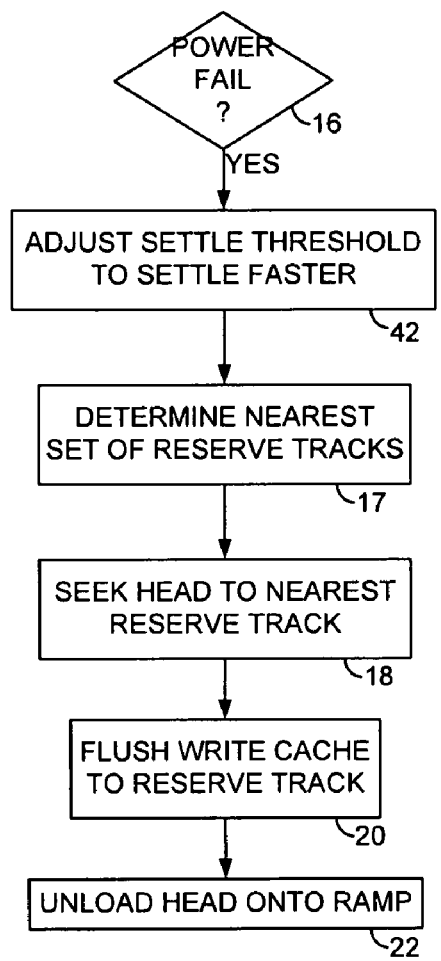
FIG. 4A is a flow diagram according to an embodiment of the present invention wherein a settle threshold is adjusted during a power failure so that the head settles sooner on the reserved tracks.
Figure 4B:
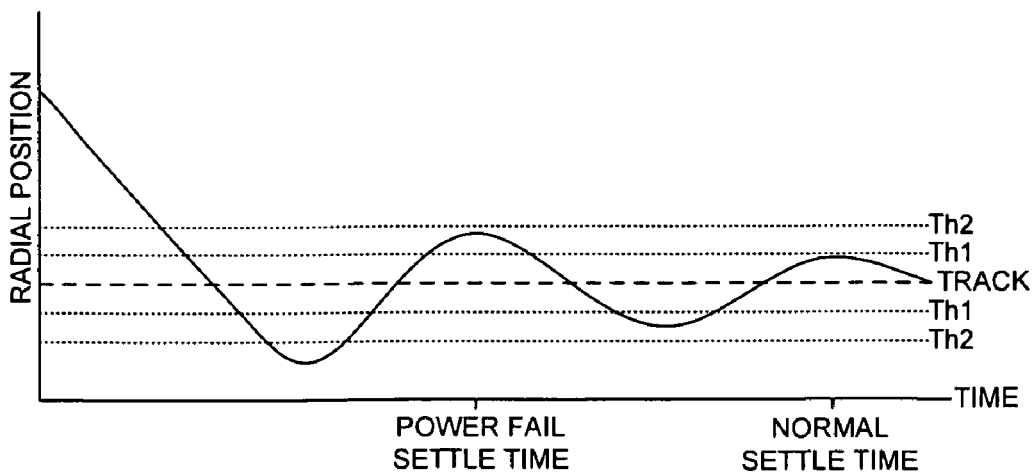
FIG. 4B illustrates how the settle threshold is adjusted during a power failure so that the head settles sooner on the reserved tracks.

FIG. 4A is a flow diagram according to an embodiment of the present invention which extends on the flow diagram of FIG. 1B, wherein when a power failure is detected (step 16) a settle threshold is adjusted (step 42) in order to seek the head using less power during a power failure. FIG. 4B shows an example embodiment wherein during normal operation a first settle threshold Th1 is employed resulting in a normal settle time. During a power failure, the settle threshold is increased to Th2 thereby decreasing the settle time which may reduce the power needed to flush the write cache since the write operation can begin sooner (less rotational latency).

Figure 5:
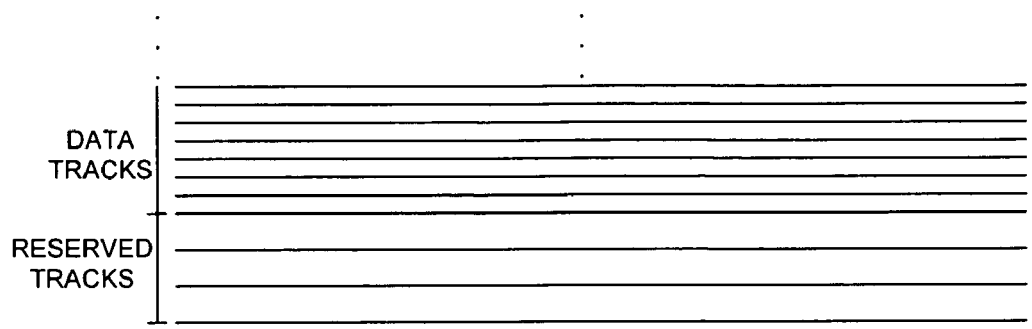
FIG. 5 shows an embodiment of the present invention wherein a radial density of the reserved tracks is decreased to facilitate a faster settle time as well as less servo power while tracking the reserved tracks.

FIG. 5 shows an embodiment of the present invention wherein the data tracks are recorded at a first radial density, and the reserved tracks are recorded at a second radial density less than the first radial density. This embodiment may help facilitate increasing the settle threshold (and decreasing the settle time) as shown in FIG. 4B by reducing adjacent track interference that may otherwise occur while writing the user data to the reserved tracks. In addition, increasing the track width of the reserved tracks may reduce the power needed by the servo system to track the centerline of the reserved tracks while writing the user data from the write cache.

Figure 6:
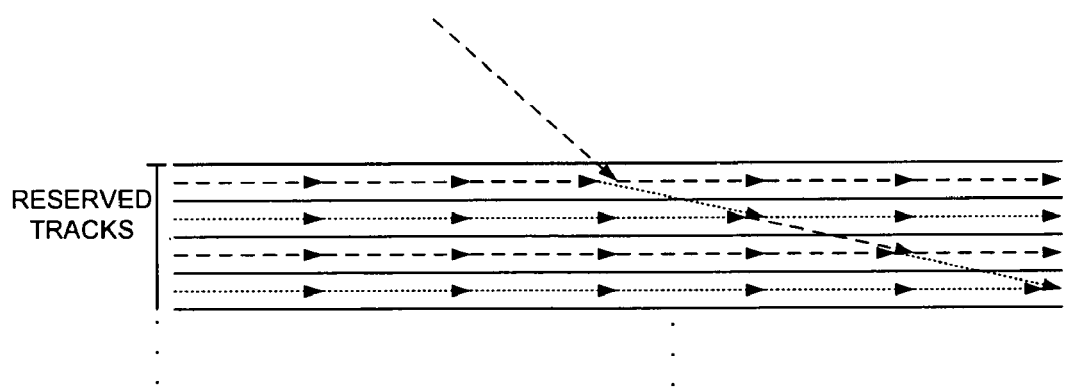
FIG. 6 shows an embodiment of the present invention wherein the user data stored in the write cache is written to the reserved tracks as soon as the head settles on the reserved track so as to substantially avoid any rotational latency.

FIG. 6 shows an embodiment of the present invention wherein after the head settles on the first reserved track the control circuitry begins writing the user data stored in the write cache to the first encountered data sector. This embodiment substantially avoids the rotational latency that would otherwise occur if the write operation had to wait until the head reached a particular data sector of the reserved track (e.g., the first data sector after an index mark). In one embodiment, the sequence of data sectors written is synchronized by writing a different sync mark to one of the data sectors. For example, in one embodiment the first data sector written comprises directory information associated with the write cache that identifies the LBAs for the user data stored in the write cache. In order to identify the first data sector in the reserved tracks, a unique sync mark is written to the first data sector that is different from the sync marks written to the other data sectors of the reserved tracks. In this manner, when the disk drive is powered on, the first data sector written in the reserved tracks can be identified by searching for the corresponding sync mark.

Figure 7A:
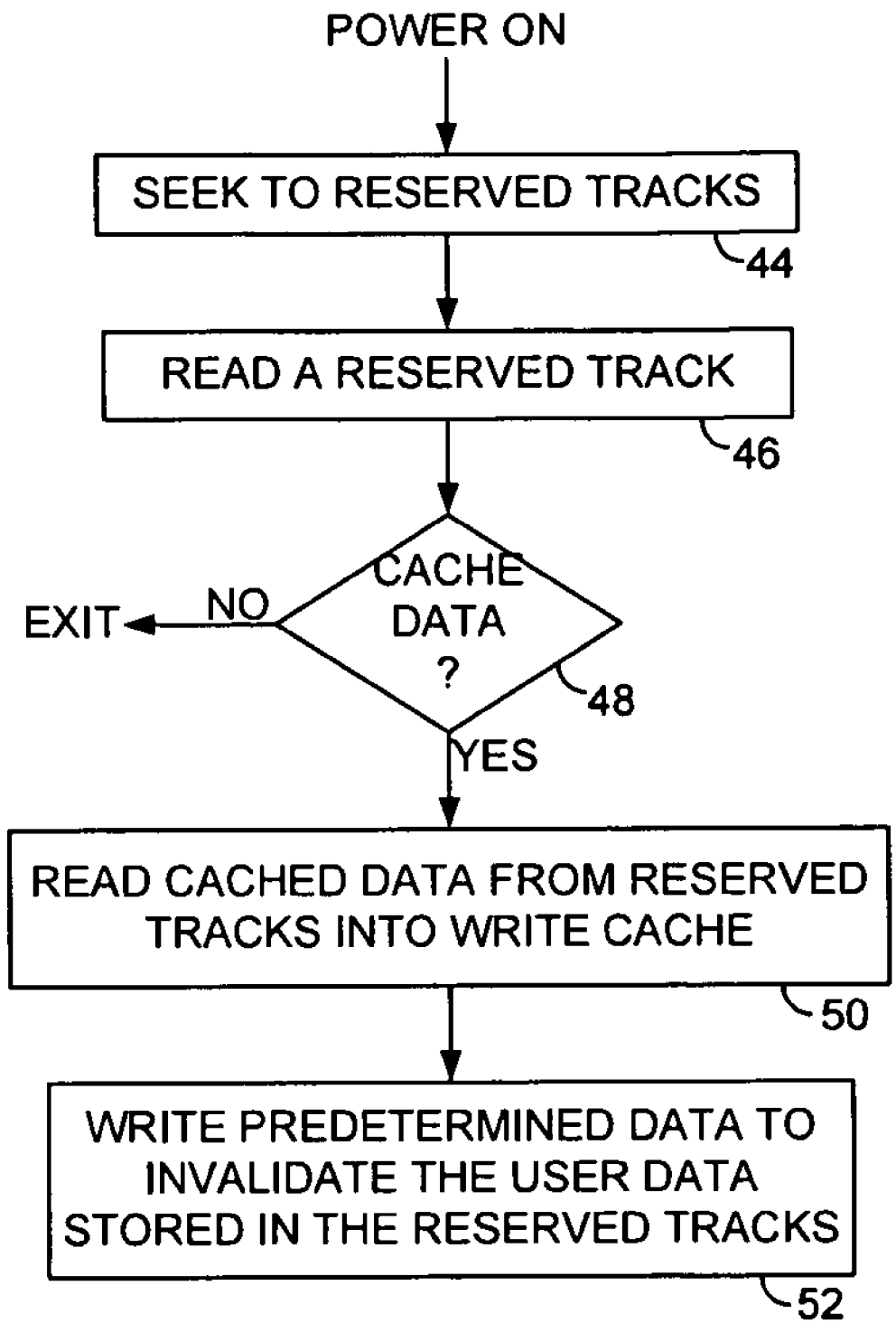
FIG. 7A is a flow diagram according to an embodiment of the present invention wherein after reading the user data from the reserved tracks at power on, the user data stored in the reserved tracks is invalidated by writing predetermined data to the reserved tracks.

FIG. 7A shows a flow diagram according to an embodiment of the present invention wherein when the disk drive is powered on the control circuitry seeks the head to one of the sets of reserved tracks (step 44) and reads a reserved track (step 46) to determine whether the reserved tracks store user data written during a power failure (step 48). If user data is stored in the reserved tracks, the user data is read from the reserved tracks into the write cache (step 50). After reading all of the user data into the write cache, predetermined data is written to the reserved track(s) (step 52) in order to invalidate the user data stored in the reserved tracks. For example, in one embodiment the predetermined data comprises zeros to effectively erase all of the data sectors, including the data sector storing the directory information.

Figure 7B:
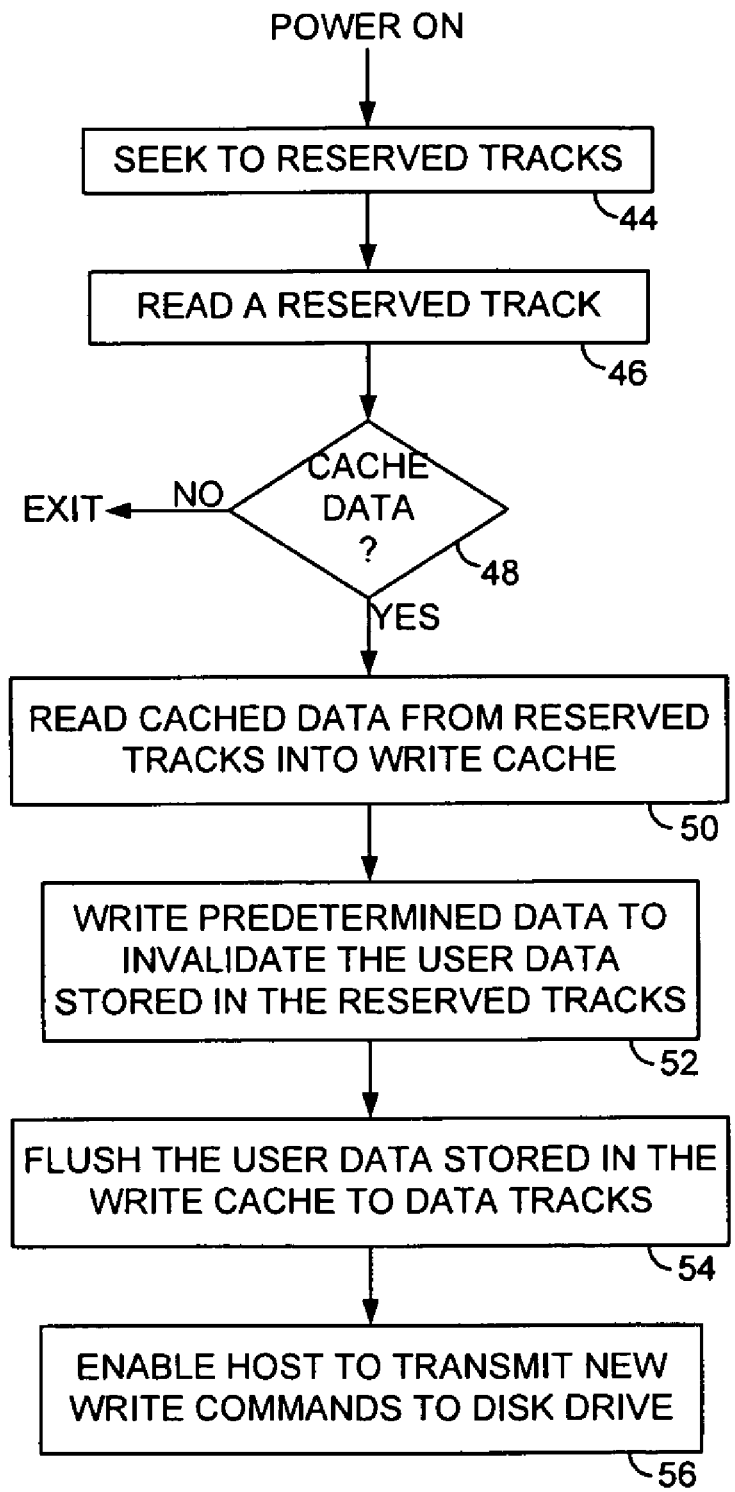
FIG. 7B is a flow diagram according to an embodiment of the present invention wherein after reading the user data from the reserved tracks at power on, the user data stored in the reserved tracks is invalidated, the user data stored in the write cache is flushed to data tracks, and the host is enabled to transmit new write commands to the disk drive.

FIG. 7B is a flow diagram which expands on the flow diagram of FIG. 7A wherein after writing the predetermined data to the reserved tracks in order to invalidate the user data stored in the reserved tracks (step 52), the user data stored in the write cache is flushed to the data tracks. In the embodiment of FIG. 7B, during the power on procedure the disk drive transmits a busy status to the host to prevent the host from transmitting new write commands until the write cache has been flushed (step 56). This embodiment may help ensure the integrity of the user data stored in the write cache by ensuring the write cache can be flushed successfully before allowing new write commands to be received from the host.

Figure 8A:
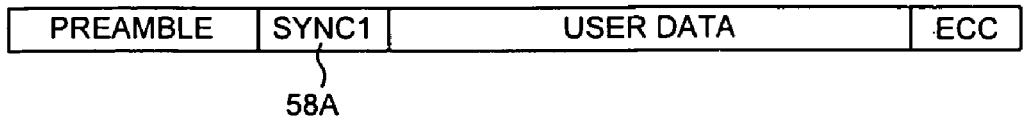
FIGS. 8A and 8B show an embodiment of the present invention wherein when the user data stored in the write cache is flushed to the reserved tracks a first sync mark is written to the data sectors, and after reading the user data from the reserved tracks at power on, the user data stored in the reserved tracks is invalidated by writing a second sync mark to the data sectors in the reserved tracks.
Figure 8B:
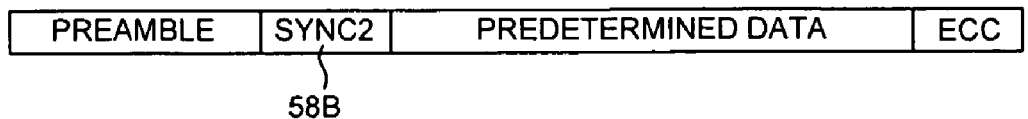

FIG. 8A shows an embodiment of the present invention wherein when writing the user data to the reserved tracks, a first sync mark 58A is written to the data sectors of the reserved tracks. After reading the user data from the reserved tracks during a power on procedure, the predetermined data written to the reserved tracks in order to invalidate the user data comprises a second sync mark 58B different from the first sync mark 58A as shown in FIG. 8B. This embodiment helps ensure that an "erased" data sector in the reserved tracks is not confused with a data sector storing valid user data.

Figure 8C:
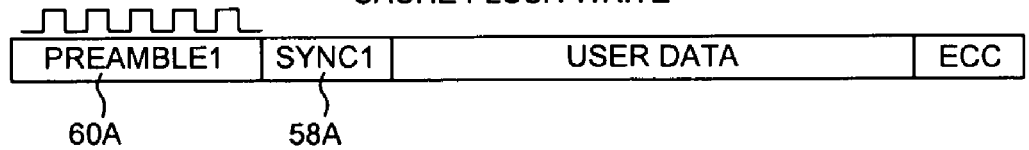
FIGS. 8C and 8D show an embodiment of the present invention wherein a preamble ending in a first phase is written when writing the first sync mark, and a preamble ending in a second phase is written when writing the second sync mark.
Figure 8D:
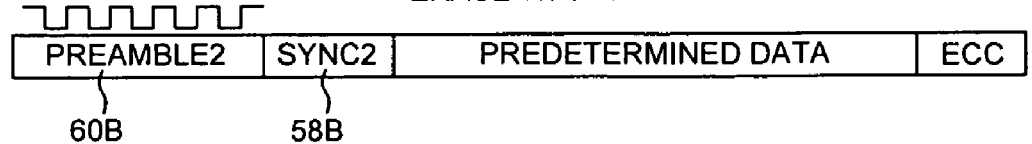

FIGS. 8C and 8D illustrate an embodiment of the present invention wherein a first preamble 60A ending with a first phase is written prior to the first sync mark 58A, and a second preamble 60B ending with a second phase is written prior to the second sync mark 58B. In this embodiment, a data sector will be considered written with user data if the first preamble 60A and the first sync mark 58A are detected, and the data sector will be considered erased if the second preamble 60B and the second sync mark 58B are detected. The preamble that is detected can be determined by evaluating the read signal samples of the preamble (e.g., the last two samples of the preamble) after detecting the sync mark.

In one embodiment, when a power failure is detected during the middle of a write operation, the writing to a current data sector is finished, and then the user data stored in the write cached is written to the nearest set of reserved tracks. In order to provide sufficient power while minimizing transients, in one embodiment a boost/brake circuit (e.g., as disclosed in the above-referenced U.S. Pat. No. 6,549,361) may be cycled a few times immediately after the power failure is detected.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk comprising a plurality of data tracks and a first and second set of reserved tracks, wherein the first set of reserved tracks are located at a first radial location, and the second set of reserved tracks are located at a second radial location different than the first radial location;
an actuator arm;
a head connected to a distal end of the actuator arm;
a ramp near an outer periphery of the disk; and
control circuitry operable to:
receive a write command from a host, the write command comprising user data;
store the user data in a cache memory;
when a power failure is detected:
determine whether the head is nearer to the first or second set of reserved tracks;
seek the head to the nearest of the first and second set of reserved tracks and write the user data stored in the cache memory; and
unload the head onto the ramp.

2. The disk drive as recited in claim 1, wherein:
the disk comprises at least three sets of reserved tracks distributed radially across the disk surface, wherein a nearest set of reserved tracks is selected to store the user data when a power failure is detected; and
a maximum seek distance to the nearest set of reserved tracks is less than one-third a stroke of the actuator arm.

3. The disk drive as recited in claim 1, wherein the control circuitry is further operable to:
seek the head using a first seek profile during normal operation of the disk drive; and
seek the head to one of the first and second set of reserved tracks using a second seek profile.

4. The disk drive as recited in claim 1, wherein the control circuitry is further operable to:
seek the head using a first settle threshold during normal operation of the disk drive; and
seek the head using a second settle threshold less than the first settle threshold when seeking the head to one of the first and second set of reserved tracks.

5. The disk drive as recited in claim 1, wherein:
the data tracks are recorded at a first radial density; and
the reserved tracks are recorded at a second radial density less than the first radial density.

6. The disk drive as recited in claim 1, wherein the control circuitry is further operable to write to a first reserved track after the head settles on the first reserved track so as to substantially avoid rotational latency.

7. The disk drive as recited in claim 1, wherein when the disk drive is powered on, the control circuitry is further operable to:
seek to one of the first and second set of reserved tracks and read initial data from one of the reserved tracks;
when the initial data indicates the reserved tracks store the user data, read the user data from the reserved tracks into the cache memory; and
write predetermined data to the reserved tracks in order to invalidate the user data stored in the reserved tracks.

8. The disk drive as recited in claim 7, wherein the predetermined data comprises zeros.

9. The disk drive as recited in claim 7, wherein:
when writing the user data to the reserved tracks, the control circuitry is further operable to write a first sync mark to a data sector of the reserved tracks; and
the predetermined data comprises a second sync mark different from the first sync mark.

10. The disk drive as recited in claim 7, wherein after writing the predetermined data to the reserved tracks the control circuitry is further operable to:
write the user data stored in the cache memory to a plurality of the data tracks; and
after writing the user data to the data tracks, enable the host to transmit new write commands to the disk drive.

11. A method of operating a disk drive, the disk drive comprising a disk, an actuator arm, a head connected to a distal end of the actuator arm, and a ramp near an outer periphery of the disk, wherein:
the disk comprises a plurality of data tracks and a first and second set of reserved tracks; and
the first set of reserved tracks are located at a first radial location, and the second set of reserved tracks are located at a second radial location different than the first radial location;
the method comprising:
receiving a write command from a host, the write command comprising user data;
storing the user data in a cache memory;
when a power failure is detected:
determining whether the head is nearer to the first or second set of reserved tracks;
seeking the head to the nearest of the first and second set of reserved tracks and write the user data stored in the cache memory; and
unloading the head onto the ramp.

12. The method as recited in claim 11, wherein:
the disk comprises at least three sets of reserved tracks distributed radially across the disk surface, wherein a nearest set of reserved tracks is selected to store the user data when a power failure is detected; and
a maximum seek distance to the nearest set of reserved tracks is less than one-third a stroke of the actuator arm.

13. The method as recited in claim 11, further comprising:
seeking the head using a first seek profile during normal operation of the disk drive; and
seeking the head to one of the first and second set of reserved tracks using a second seek profile.

14. The method as recited in claim 11, further comprising:
seeking the head using a first settle threshold during normal operation of the disk drive; and
seeking the head using a second settle threshold less than the first settle threshold when seeking the head to one of the first and second set of reserved tracks.

15. The method as recited in claim 11, wherein:
the data tracks are recorded at a first radial density; and
the reserved tracks are recorded at a second radial density less than the first radial density.

16. The method as recited in claim 11, further comprising writing to a first reserved track after the head settles on the first reserved track so as to substantially avoid rotational latency.

17. The method as recited in claim 11, wherein when the disk drive is powered on, further comprising:
seeking to one of the first and second set of reserved tracks and read initial data from one of the reserved tracks;
when the initial data indicates the reserved tracks store the user data, reading the user data from the reserved tracks into the cache memory; and
writing predetermined data to the reserved tracks in order to invalidate the user data stored in the reserved tracks.

18. The method as recited in claim 17, wherein the predetermined data comprises zeros.

19. The method as recited in claim 17, wherein:
when writing the user data to the reserved tracks, further comprising writing a first sync mark to a data sector of the reserved tracks; and
the predetermined data comprises a second sync mark different from the first sync mark.

20. The method as recited in claim 17, wherein after writing the predetermined data to the reserved tracks further comprising:
writing the user data stored in the cache memory to a plurality of the data tracks; and
after writing the user data to the data tracks, enabling the host to transmit new write commands to the disk drive.

* * * * *